United States Patent [19]

Meyers et al.

[11] Patent Number: 4,505,936
[45] Date of Patent: Mar. 19, 1985

[54] PROCESS FOR THE UTILIZATION OF SHELLFISH WASTE

[75] Inventors: Samuel P. Meyers; Huei-Mei Chen, both of Baton Rouge, La.

[73] Assignee: Louisiana State University, Baton Rouge, La.

[21] Appl. No.: 532,179

[22] Filed: Sep. 14, 1983

[51] Int. Cl.³ .................. A22C 29/02; A23K 1/10
[52] U.S. Cl. ....,.................................. 426/1; 426/540; 426/429; 426/479
[58] Field of Search .............. 426/1, 643, 655, 540, 426/429, 479, 478

[56] References Cited

U.S. PATENT DOCUMENTS

| 353,822 | 12/1886 | Sahlstrom | 426/437 X |
| 1,824,685 | 9/1931 | Pittock | 426/437 X |
| 3,906,112 | 9/1975 | Anderson | 426/429 X |

Primary Examiner—Robert Yoncoskie
Attorney, Agent, or Firm—Llewellyn A. Proctor

[57] ABSTRACT

A novel process for the more efficient extraction with an edible oil of the red carotenoid pigment astaxanthin, from the chitinous shells and proteinaceous tissues of shellfish to provide an astaxanthin enriched dietary food ingredient, and other food products. A crustacean waste, e.g. a crawfish waste, is ground in an attrition mill to separate the soft proteinaceous tissue from the chitinous shell, the chitinous shell is removed, and the separated proteinaceous tissue is acidified to pH ranging from about 4 to 5.5 sufficient to suppress microbial degradation and improve overall pigment recovery. The acidified proteinaceous tissue is cooked, as a puree, in a kettle and extracted with certain edible oils at critical concentrations, at specified critical temperature-time relationships. The cooked product is centrifuged in a decanter centrifuge to provide two effluent streams: (a) an aqueous effluent which is separated in a three-phase separator (liquid-liquid-solid) to provide an astaxanthin enriched oil, a flavored water extract and demineralized solids, and (b) a demineralized solids effluent. The demineralized solids from both (a) and (b), the astaxanthin enriched oil, and the flavored water extract are useful as food supplements.

17 Claims, 1 Drawing Figure

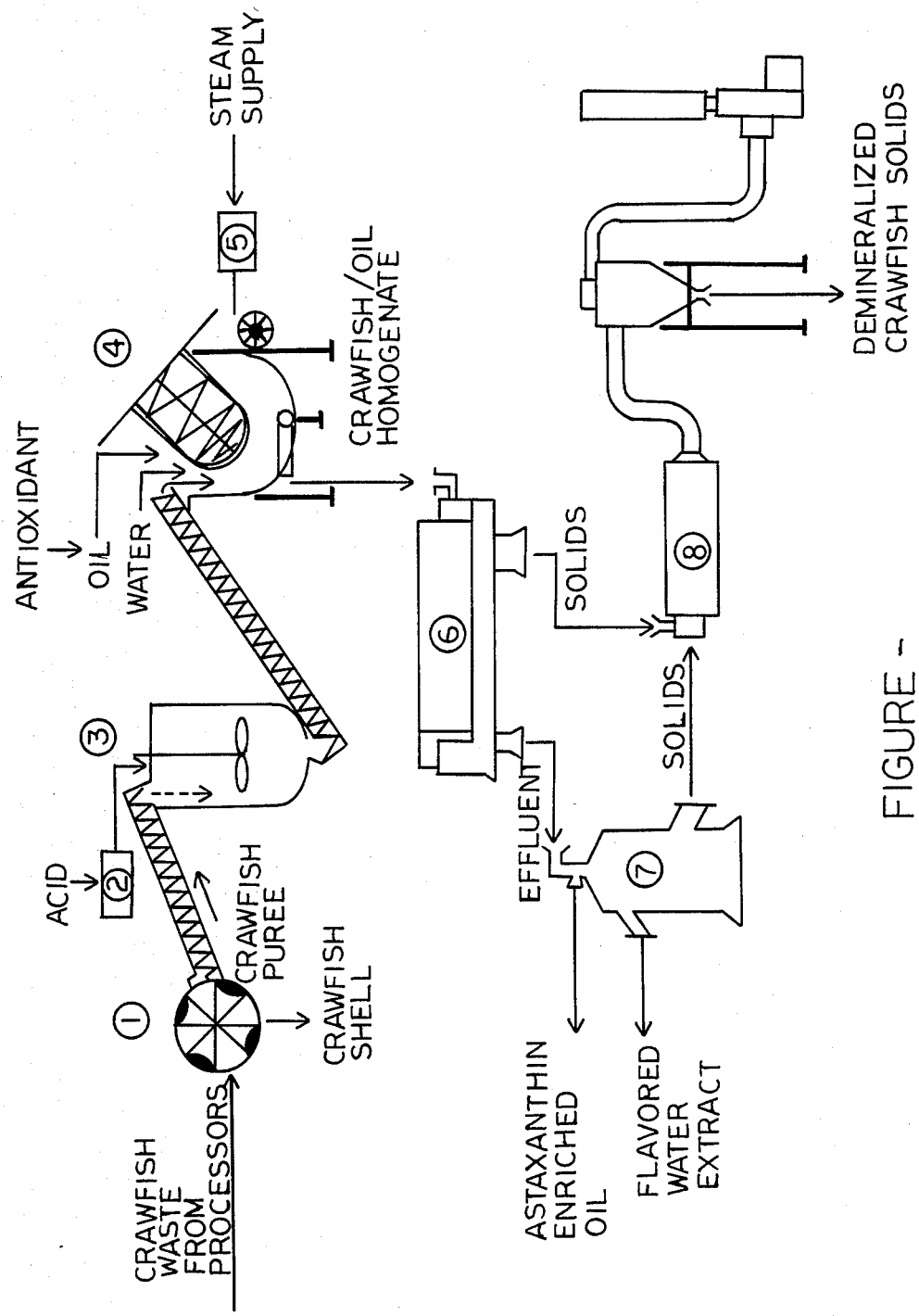
FIGURE -

PROCESS FOR THE UTILIZATION OF SHELLFISH WASTE

BACKGROUND AND PROBLEMS

1. Field of the Invention

This invention relates to a process for the extraction of astaxanthin from shellfish, or crustaceans; especially from shellfish, or crustacean wastes.

2. Background and Prior Art

Aquaculture is becoming one of the fastest growing industries in this country, this relatively new industry being sometimes referred to as the "blue revolution". Aquaculture research and development programs are carried on by the U.S. Department of Agriculture, and aquacultural research is being conducted in this country at perhaps thirty-five universities. Much of the farm-grown fish and shellfish industry is concentrated in Mississippi, Arkansas, Alabama and Louisiana because of the benign climate and plentiful water. The largest domestic shellfish, or crustacean industry relates to the production of crawfish (Procambarus clarkii), the largest concentration of this industry being located in Louisiana. The interest in farm-grown fish and shellfish, however, is world wide.

Fish raised on fish-farms or in hatcheries generally lack the skin and flesh colors characteristic of fish produced in their natural environment. Fish produced on farms and in hatcheries are white, and pale as contrasted with similar fish produced in their natural environment. For this reason there is a strong consumer preference for fish taken from their natural environment, albeit nutritionally the farm produced fish may be identical to those produced in their natural environment. The difference in skin pigmentation between the fish (and some fowls) results from dietary sources, the material predominantly responsible for the more desirable orange, pink or reddish colors having been identified as the red carotenoid pigment astaxanthin (astacin) which is present in the shells and tissues of shellfish, e.g. shrimp, crawfish, crabs and other crustaceans. The pale color of fish raised on fish-farms or in hatcheries, it has been found, is improved when the fish are fed a diet supplemented by large quantities of dried, ground-up exoskeletal crustacean remains. However, a satisfactory color can be developed in this manner of feeding only over long periods of time; and it is desirable, if not indeed essential in the economic sense, to develop satisfactory colors within very short periods of time. Moreover, it is desirable, if not indeed necessary, to use only coloring agents which are derived from the fishes natural environment. It has been learned, on the other hand, that the red carotenoid pigment can be extracted from the exoskeletal crustacean shells and tissues and fed, admixed with other feed in dietary formulations, to the farm fish, crustacea (and certain fowls) in massive concentrations to develop satisfactory skin pigmentations over short periods of time.

Disposal of shellfish waste is in itself a very difficult problem, and regulatory restraints will soon prohibit present landfill disposal practices which will create even greater need for economically sound alternatives to present waste disposal needs. In Louisiana alone, in excess of ten thousand tons of crawfish, shrimp, and other crustacean waste are generated annually, and this has created serious environmental and regulatory problems. Various proposals have been made to extract the valuable pigment from this present source of waste, and simultaneously eliminate a troublesome disposal problem. However, there is need for a process worthy of commercial consideration.

A method for the extraction of the astaxanthin, or red carotenoid pigment, from crustacean shell and tissue waste is described, e.g. in U.S. Pat. No. 3,906,112 which was issued on Sept. 16, 1975 to Lyle K. Anderson of Bioproducts, Inc. A shrimp waste is steam cooked, then pressed to remove the solids as waste, and produce a watery milky pink liquid. The watery milky pink liquid is emulsified and extracted with a triglyceride oil, e.g. a soybean oil. It is mentioned that soybean oil is added in a relatively small quantity, i.e., less than 0.1% by the volume of stickwater. The oil is turbulently mixed, heated, and the oil fraction recovered by centrifugal extraction. Farm raised salmon and trout fed with a concentrate of the oily material, it is suggested, develop dark orange or reddish flesh and bright external markings as found on such fish produced in their natural environment.

In *Journal of Food Science*, Volume 47 (1982), in an article by Applicants, entitled "Extraction of Astaxanthin Pigment from Crawfish Waste Using a Soy Oil Process," various extraction techniques are described. For example, an improvement of the aforementioned soy oil carotenoid astaxanthin extraction process is reported, the carotenoid astaxanthin in this instance being extracted from crawfish waste. In general, in accordance with this procedure, a whole crawfish waste is ground-up, the comminuted crawfish waste admixed with water, the pH is adjusted with an alkali or acid, an enzyme is added to the solution, and the solution stirred, heated and hydrolyzed. After hydrolysis, the astaxanthin is extracted with oil and the astaxanthin enriched oil recovered by centrifugation.

There is no suggestion, or intimation, within the metes and bounds of these references of a process of practical commercial interest, e.g. a process capable of efficiently producing, inter alia, an edible oil containing as much as 600 ppm or higher, of astaxanthin, a concentration required for commercial food and feed applications.

3. Objects

It is, accordingly, a primary objective of this invention to supply this need; or more particularly an object of this invention to provide a new and improved process for the more efficient extraction of commercially significant concentrations of the red carotenoid pigment astaxanthin from the shells and tissues of shellfish, or crustaceans.

A further object of this invention is to provide a process as characterized, useful for the production from shellfish, or crustacean waste a red pigment-rich oil product, and other products, applicable in a variety of dietary formulations, or as food.

A further, and more specific object is to provide a process as characterized, useful for the production from the waste of exoskeletal crustacean shells and tissue, notably crawfish chitin, astaxanthin enriched oil, flavored water extracts and demineralized meals useful in various dietary formulations, feed supplements or as foods.

4. The Invention

These and other objects are accomplished in accordance with the present invention embodying a process the steps of which include, in combination:

(a) Grinding or comminuting shellfish, or crustacean waste, to tear and separate the soft proteinaceous tissue from the chitinous shell, separating and removing the chitinous shell from the proteinaceous tissue and recovering the proteinaceous tissue as a paste, or puree. A feature of this invention is that the waste is ground in an attrition mill adequately to achieve effective separation of the chitinous shell from the proteinaceous tissue.

(b) The proteinaceous paste, or puree, is pretreated with sufficient acid to lower the pH of the paste, or puree, to within a range of from about 4 to about 5.5, preferably about 4.3 to about 4.7 to suppress microbial degradation, demineralize and decalcify the small amount of chitinous shell which remains in the puree, and improve overall red carotenoid pigment recovery during the subsequent extraction with oil.

(c) An edible oil is admixed with the acidized proteinaceous paste, or puree, in concentration ranging from about 8 percent to about 14 percent, preferably from about 10 percent to about 12 percent, based on the weight of the puree.

(d) The oil-containing acidized proteinaceous paste, or puree, is heated at temperatures ranging from about 170° F. to about 200° F., preferably from about 180° F. to about 195° F., for time sufficient to optimize extraction of the red carotenoid pigment by the oil.

(e) The cooked oil-proteinaceous homogenate is separated by centrifugation into a water and oil effluent and a solids effluent.

(f) The water and oil effluent is separated into a red carotenoid pigment enriched oil, and flavored water extract.

The demineralized solids from the separations are recoverable, and suitable per se as a dietary product, or can be dried to produce a demineralized meal also suitable as a feed or food product.

Under the controlled conditions, with all parameters specified, the astaxanthin concentration in the pigment enriched oil can be regulated and determined on a predictable basis.

The process, and the principle of its operation, will be better understood by reference to the following more detailed description of a preferred embodiment, and to the attached FIGURE to which reference is made as the description unfolds. A crawfish waste, a waste which is difficult to dispose of, for which reason it has caused increasing financial and environmental problems in many crawfish producing, and processing areas of this country, is a preferred raw material for the process; this material being representative of a shellfish or crustacean waste which can be processed in accordance with this process.

Referring to the FIGURE, first generally, there is depicted in schematic fashion, an attrition mill (1) for the receipt and comminution of the crawfish waste. A proteinaceous paste or puree is separated from the chitinous shell, and charged with acid from an acid pretreat station (2) into a mixing vat (3), wherein the pH of the crawfish paste is adjusted. The acid-treated crawfish paste is charged with an extractant oil, or pigment carrier and additionally, if desired, water and an antioxidant, into a temperature regulated kettle, e.g. a steam jacketed kettle (4) the temperature of which is regulated by a steam pressure regulator (5). The crawfish-oil homogenate, i.e. a paste consisting essentially of crawfish ingredients, water and oil, is next passed to a decanter centrifuge (6), from which there is recovered a principally liquid and a solids effluent. The liquid effluent is treated in a three-phase (liquid-liquid-solids) separator (7) from which there is recovered, as products, a flavored water extract and an astaxanthin enriched oil. The wet demineralized solids recovered from the decanter centrifuge per se, and that passed to the dehydrator (8) constitute useful food products, as does the dried demineralized crawfish meal which is passed into the dehydrator (8), dried and then recovered.

These various steps are described in further detail as follows:

(1) In the initial step of the operation, a crawfish waste, from processing plants from which the tailmeat has been removed, is charged into the attrition mill (1) and the waste is ground at ambient temperature and pressure to tear and separate the tissue from the shell, as well as optimize the size of the particles, controlled by perforation size of the mill screen, to facilitate pigment release during the subsequent oil extraction. By grinding the waste to average particle sizes ranging from about 1/32 inch to about ½ inch, preferably from about 1/16 inch to about ⅜ inch, particle size diameter, maximum pigment extraction from the soft tissue is obtainable, and the tissue converted into more desirable essentially shell-free proteinaceous products. It is essential that a maximum amount of the shell, preferably at least about 10 percent to about 15 percent, and more preferably from about 15 percent to about 20 percent, of the chitinous shell, based on the weight of the waste ground in the mill, be separated and removed from the proteinaceous tissue which is passed downstream for further processing. By minimizing the amount of the shell that is contained in the proteinaceous crawfish paste, the subsequent oil-pigment extraction steps are performed without hindrance, pigment recovery is facilitated, and the overall efficiency of the process is increased because there is better separation and less loss by adhesion of the extractant oil to the shell. The crawfish shell recovered from the attrition mill is a useful material for conversion by conventional means to chitin, and chitosan.

(2-3) The proteinaceous crawfish paste, or puree from the attrition mill (1) is passed, as via a screw conveyor, into the mixing vat (3), to which an acid or acid solution is added from acid treat station (2), and agitated. The acid addition suppresses and retards to normal microbial degradation of the pigment; for rarely is a crawfish paste or puree stable enough without acid addition to endure beyond about twelve hours without significant deterioration, and loss of pigment. Acid addition, moreover, improves pigment recovery from the paste by as much as 5 to 10 percent, as contrasted with an extraction process utilizing a similar oil under similar conditions, except that acid was not used to stabilize the crawfish paste.

Sufficient acid is added to the crawfish puree of the mixing vat (3) to provide a final pH ranging from about 4 to about 5.5, but preferably a pH of from about 4.3 to about 4.7 is employed. It has been found that a pH of from about 4.3 to about 4.7 will stabilize the crawfish paste for a period of about six weeks, and provide essentially maximum pigment recovery.

Various acids may be used to pretreat the crawfish paste, or puree, in the practice of this invention; both mineral acids and organic acids. For example, sulfuric acid and hydrochloric acid can be used, but these acids are less effective than organic acids, which are preferred. Exemplary of organic acids found useful in accordance with this invention are the carboxylic acids, both the monocarboxylic acids and polycarboxylic acids, preferably the latter and especially those acids containing from 1 to about 10 carbon atoms, e.g. formic acid, acetic acid, propionic acid, butyric acid, caproic acid and the like. Chelating agents, e.g. ethylenediamine, tetraacetate and the like, preferably chelating agents admixed with antioxidants, e.g. butylated hydroxyanisole, and the like are also added to preserve the crawfish puree, and simultaneously stabilize the astaxanthin pigment against degradation.

(4–5) The acidified proteinaceous crawfish puree from the mixing vat (3), or holding tank, or tanks (not shown) has been stored, is passed as via a screw conveyor to the temperature regulated stirred kettle (4), suitably a steam-jacketed kettle through the jacket of which steam is injected in heat-exchange relationship with the puree. An extractant oil in concentration sufficient to obtain an optimum yield, and water, if desired to facilitate the mixing action, are added. The temperature of the kettle is regulated by steam injection from steam regulator (5) to provide a temperature ranging from about 170° F. up to about 200° F., preferably from about 180° F. to about 195° F. for time sufficient to disassociate the proteincarotenoid bonds, wherein the pigment becomes soluble in the dispersed oil, and to optimize the extraction of the pigment by the extractant oil. Treatments at this temperature can range between about 15 minutes to about two hours, or more. Preferably, however, the temperature is maintained between about 180° F. and about 195° F., and within this range of temperature it has been found that a cooking time ranging from about 45 minutes to about one and one-quarter hours will maximize pigment recovery, with minimal pigment degradation and loss.

Various edible, or food oils can be used for extraction of the pigment from the proteinaceous puree, vegetable and fish oils being preferred, especially the highly refined oils. Soybean oil, particularly a highly refined oil free of foreign color and mucilageous materials, is especially preferred. Cottonseed oil is also exemplary of a suitable vegetable oil. Exemplary of suitable fish oils are menhaden oil, herring oil, salmon oil, mackerel oil and the like. The type oil and grade of oil has been found highly significant in terms of its effectiveness in extracting the pigment from the puree, a fully refined soybean oil free of foreign color and mucilageous materials having been found to extract as much as 20 to 30 percent more pigment from a puree vis-a-vis a puree extracted with a once refined soybean oil at otherwise similar conditions. Optimization of temperature, time, and use of a fully refined soybean oil for extraction of the pigment has, in fact, provided up to a 50 percent increase in the amount of pigment extraction vis-a-vis a process operated at otherwise similar conditions except that lower temperature, shorter cooking time, and once refined soybean oil was used for the pigment carrier, or pigment extractant.

(6) The crawfish/oil homogenate, or slurry, is metered from the steam kettle (4) via a metering pump (not shown) into a decanter centrifuge (6). A solids effluent is separated, preferably continuously therefrom and charged into the dehydrator (8).

A liquid effluent comprised of water, oil and minimal amounts of solids is removed from the decanter centrifuge (6) and passed into the three-phase (liquid-liquid-solid) separator (7).

(7) From the three-phase separator (7) there is removed an astaxanthin enriched oil containing generally from about 600 parts to about 850 parts, and higher, of astaxanthin per million parts by weight of oil. This is found to be an excellent material for dietary formulations, particularly when used in admixtures with feed for increasing the orange, pink or reddish skin pigmentation in fish, and certain fowls.

From the three-phase separator (7) is also discharged a lighter pigmented oil which is removed from the heavier liquid phase containing flavored water extract. The flavored water extract is rich in nutrients, is highly flavored and also of value as a food or food additive. The flavored water extract is generally recycled via means not shown to the kettle (4) for maximizing process heat recovery, and also to concentrate the nutrients within the stream until final discharge and recovery from the three-phase separator (7). The small amount of solids which are discharged at regular intervals are recovered from the separator (7) and passed into the dehydrator (8). The chitinous solids contain no more than about five percent calcium, as contrasted with the chitinous solids removed from the attrition mill (1) which contain about seventeen percent calcium.

(8) The wet demineralized crawfish meal discharged from dehydrator (8), containing up to about 40 percent moisture, is suitable as a feed supplement and contains up to about 30 percent of the astaxanthin originally present in the crawfish waste.

(9) The wet, demineralized crawfish meal from dehydrator (8) can be dried by heat evaporation down to about 10 percent moisture, or less. This material when so treated loses much of the residual astaxanthin. It is useful as a dry meal for use in animal and aquatic diets.

These and other features of the invention will be better understood by reference to the following examples, and comparative data, which illustrate the invention. All parts are in terms of weight units except as otherwise specified.

The example which immediately follows is illustrative of a typical run selected from a number of runs made at essentially similar conditions.

EXAMPLE 1

One ton of crawfish waste was ground through an attrition mill. This produced approximately 1800 pounds of pigment-rich proteinaceous puree and 200 pounds of chitinous shell, which was separated from the puree.

The pigment-rich puree was charged into a continuously stirred mixing vat, and propionic acid was added to the vat while the puree and acid were mixed. After the acid had been added in concentration sufficient to provide about 7.5%, based on the weight of the puree, there was no longer any bubbling action when acid was added and the final pH was 5.0 (Tests showed that the puree was microbiologically-stable at ambient temperature for at least 5 days.)

The contents of the vat were charged to a steam-jacketed kettle. A fully refined soybean oil and tap water were added to the kettle in concentration of 12 percent and 40 percent, respectively, based on the weight of the puree. The puree-oil-water slurry was cooked in the kettle with vigorous agitation at a temperature of 180° F. to 195° F., for 60 to 75 minutes. The processed puree-oil-water slurry was conveyed through a metering pump to a decanter centrifuge for separation of the slurry into two discharge streams of solid and aqueous effluent. The aqueous effluent, maintained at 165° F. to 185° F., was pumped via a metering pump to a three-phase separator. Amounts in excess of 85 percent to 95 percent of the initial oil was recovered from the three-phase separator as a pigment concentrate with an astaxanthin concentration of 650 to 700 ppm.

The following example illustrates the effect of cooking time as relates to the effectiveness of pigment extraction.

EXAMPLE 2

The foregoing example was repeated except that in this instance, after the contents of the vat was charged to a steam-jacketed kettle, sufficient of the fully refined soybean oil was added to the kettle to provide a 10 percent concentration of the oil and the puree-oil-water slurry was cooked. On initiation of cooking, and throughout the cooking period portions of the processed puree-oil-water slurry were withdrawn at intervals, the oil was separated from the slurry by centrifugation, and the oil analyzed to determine the concentration of pigment within the oil. The results are given as follows:

| Cooking Time,[1] Minutes | Pigment Concentration, ppm |
| --- | --- |
| 0 | 614.2 |
| 30 | 687.3 |
| 60 | 722.0 |
| 75 | 726.0 |
| 90 | 761.7 |
| 105 | 732.9 |
| 110 | 699.5 |

[1]The cooking time begins at 90° C. In other words, at "0" cooking time the temperature of the puree is 90° C.

The following examples exemplify the extraction efficiency of different oils.

EXAMPLE 3

Example 2 was repeated except that in this instance menhaden oil was employed as the pigment extractant, or carrier, and it was used in 8 percent concentration, with the following results:

| Cooking Time, Minutes | Pigment Concentration, ppm |
| --- | --- |
| 0 | 678 |
| 15 | 679 |
| 30 | 701 |
| 45 | 723 |
| 60 | 656 |
| 75 | 650 |

EXAMPLE 4

When example 2 was repeated except that herring oil was used in 8 percent concentration, the maximum pigment concentrated in the oil was found to approximate 747 ppm, this being compared with a maximum pigment concentration of about 787 ppm when fully refined soybean oil is used in similar concentration at essentially the same conditions; or a maximum pigment concentration of about 511 ppm when once-refined soybean oil is employed in similar concentration at similar conditions.

EXAMPLE 5

When example 2 was repeated except that salmon oil was employed, the following results were obtained.

| Cooking Time, Minutes | Pigment Concentration, ppm |
| --- | --- |
| 0 | 488 |
| 15 | 549 |
| 30 | 580 |
| 45 | 592 |
| 60 | 600 |
| 75 | 606 |

EXAMPLE 6

In this example there is shown the results obtained in comparative runs wherein two crawfish purees were acid treated with propionic acid, the acid treated purees charged to the kettle and a fully refined soybean oil added to the kettle to provide a 10 percent concentration of the oil, and the puree-oil-water slurries cooked. In one instance, however, shell was extracted from the puree, and in the other the shell was admixed with the puree. In each instance the astaxanthin was extracted from the puree at "0" minutes cooking time, viz. when the temperature of the puree had reached 90° C.

The following table shows the results obtained from each puree, viz. the "crawfish puree" and the "crawfish puree plus shell" (1) without treatment with the acid i.e. at "control," and (2) with treatment of the acid to bring the "crawfish puree" and "crawfish puree plus shell" to pH ranging from 5.0 to 5.5.

| | Treatment | pH | Pigment Concentration, ppm |
| --- | --- | --- | --- |
| Crawfish puree | Control | 7.5–8.0 | 620.0 |
| | Propionic acid (7.5%) | 5.0–5.5 | 682.0 |
| Crawfish puree plus shell | Control | 8.0–8.5 | 574.1 |
| | Propionic acid (13%) | 5.0–5.5 | 772.4 |

It is apparent that various modifications and changes can be made without departing the spirit and scope of the invention.

Having described the invention, what is claimed is:

1. A process for the extraction with an edible oil of astaxanthin from a crustacean waste comprising chitinous shell and proteinaceous tissue to produce an astaxanthin enriched dietary food supplement with significant pigment concentration, which comprises comminuting the crustacean waste in an attrition mill to tear and separate the soft proteinaceous tissue from the chitinous shell, separating the chitinous shell from the remaining proteinaceous puree, acidifying the proteinaceous puree with an acid to a pH ranging from about 4 to about 5.5, adding an edible oil to the acidified proteinaceous puree in concentration ranging from about 8 percent to about 14 percent, based on the weight of the puree, cooking the edible oil-containing acidified puree at a temperature ranging from about 170° F. to about 200° F. for a time sufficient to disassociate the protein-carotenoid bonds of the astaxanthin pigment and obtain a cooked oil homogenate, and separating the cooked oil homogenate into a demineralized chitinous solids effluent, and an astaxanthin enriched oil pigment and flavored water extract.

2. The process of claim 1 wherein, in the attrition mill, from about 10 percent to about 15 percent of the chitinous shell is separated from the proteinaceous puree, on a weight basis.

3. The process of claim 1 wherein the proteinaceous puree is admixed with sufficient acid to provide a pH ranging from about 4.3 to about 4.7.

4. The process of claim 1 wherein the acid is an organic acid.

5. The process of claim 4 wherein the organic acid is a monocarboxylic acid.

6. The process of claim 1 wherein the concentration of the edible oil added to the acidified proteinaceous puree ranges from about 10 percent to about 12 percent, based on the weight of the puree.

7. The process of claim 1 wherein the edible oil added to the acidified proteinaceous puree is a vegetable oil or fish oil.

8. The process of claim 7 wherein the edible oil is a soybean oil.

9. The process of claim 7 wherein the edible oil is a fully refined soybean oil free of foreign color and mucilageous materials.

10. The process of claim 7 wherein the edible oil is selected from the group consisting of soybean oil, cottonseed oil, menhaden oil, herring oil, salmon oil and mackerel oil.

11. The process of claim 1 wherein the edible oil-containing acidified puree is cooked at a temperature ranging from about 180° F. to about 195° F.

12. The process of claim 1 wherein the edible oil-containing acidified puree is cooked for a period ranging from about one-quarter hour to about two hours.

13. The process of claim 1 wherein the edible oil-containing acidified puree is cooked at a temperature ranging from about 180° F. to about 195° F. for a period ranging from about 45 minutes to about one and one-quarter hours.

14. The process of claim 13 wherein the added oil is a fully refined soybean oil free of foreign color and mucilageous materials.

15. The process of claim 1 wherein the edible oil-containing acidified puree is cooked at a temperature ranging from about 180° F. to about 195° F. for a period ranging from about 45 minutes to about one and one-quarter hours, the added oil is a fully refined soybean oil free of foreign color and mucilageous materials, and an astaxanthin enriched oil containing from about 600 ppm to about 850 ppm of the astaxanthin pigment is recovered.

16. The process of claim 1 wherein the demineralized chitinous solids effluent separated from the cooked oil homogenate is dehydrated to produce a dried, demineralized food product.

17. The process of claim 1 wherein, in the attrition mill, from about 10 percent to about 20 percent of the chitinous shell is separated from the proteinaceous puree, on a weight basis.

* * * * *